(12) United States Patent
Nakajima et al.

(10) Patent No.: US 9,017,475 B2
(45) Date of Patent: Apr. 28, 2015

(54) METAL PIGMENT COMPOSITION

(75) Inventors: Kazuko Nakajima, Tokyo (JP); Shigeki Katsuta, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 1718 days.

(21) Appl. No.: 12/166,733

(22) Filed: Jul. 2, 2008

(65) Prior Publication Data

US 2010/0000445 A1 Jan. 7, 2010

(51) Int. Cl.
- *C09C 1/62* (2006.01)
- *C04B 14/00* (2006.01)
- *C09B 57/10* (2006.01)
- *C09D 7/12* (2006.01)
- *C09D 17/00* (2006.01)
- *C08K 3/08* (2006.01)
- *C08K 5/00* (2006.01)
- *C08K 9/04* (2006.01)

(52) U.S. Cl.
CPC . *C09B 57/10* (2013.01); *C08K 3/08* (2013.01); *C08K 5/005* (2013.01); *C08K 9/04* (2013.01); *C09D 7/1241* (2013.01); *C09D 7/1291* (2013.01); *C09D 17/006* (2013.01)

(58) Field of Classification Search
CPC ............ C08K 3/08; C08K 5/005; C08K 9/04; C09B 57/10; C09D 17/006; C09D 7/1241; C09D 7/1291
USPC ................................................. 106/404, 479
See application file for complete search history.

(56) References Cited

U.S. PATENT DOCUMENTS

| 7,767,018 B2 * | 8/2010 | Nakajima et al. .............. 106/403 |
| 2002/0001708 A1 * | 1/2002 | Flaherty et al. ................ 428/328 |
| 2003/0066457 A1 * | 4/2003 | Hashizume et al. .......... 106/404 |

FOREIGN PATENT DOCUMENTS

| JP | 6-57171 | 3/1994 |
| JP | 2000-7939 | 1/2000 |
| JP | 2003-327987 | 11/2003 |
| WO | WO 02/31061 A1 | 4/2002 |

OTHER PUBLICATIONS

Office Action issued Feb. 22, 2012 in corresponding Japanese Application No. 2006-316487.
Office Action issued Feb. 22, 2012 in corresponding Japanese Application No. 2006-316488.

* cited by examiner

*Primary Examiner* — Shuangyi Abu Ali
(74) *Attorney, Agent, or Firm* — Finnegan, Henderson, Farabow, Garrett & Dunner, L.L.P.

(57) ABSTRACT

An object of the present invention is to provide a metal pigment composition having the characteristics that aging stability is excellent, reductions of brightness, masking and flip flop appearance are little, and storage stability is excellent. The present invention is directed to a metal pigment composition containing a metal pigment treated with at least one of organic molybdenum compounds, or a metal pigment composition containing a metal pigment treated with at least one of organic molybdenum compounds, and at least one agent selected from the groups consisting of an anti-oxidizing agent, an anti-reducing agent and a photostabilizer.

11 Claims, No Drawings

METAL PIGMENT COMPOSITION

FIELD OF THE INVENTION

The present invention relates to a metal pigment composition suitable for paint, in particular, aqueous paint.

BACKGROUND OF THE INVENTION

Recently, in the field of paint, in order to save natural resources and deal with pollution, aqueous paint containing an extremely small amount of organic solvent or aqueous paint without containing organic solvent has been frequently used.

In addition, owing to remarkable progress of technology for aqueous paint, the high-grade finished appearance which has been attained only by solvent-type paint has become to be realized even by the use of an aqueous paint.

However, in metallic paint containing a metal pigment such as aluminum or zinc, the practicable aqueous paints are hardly known. This is because a metal pigment easily corrodes in an aqueous paint. When metal powder is present in aqueous paint, corrosion due to water occurs in any one of acidic, neutral or basic region or two or more thereof, depending upon the nature of the metal used as the metal powder. As a result, hydrogen gas occurs. The occurrence of hydrogen gas is an extremely significant problem in view of safety when paint makers use paints and when automobile makers, home electronics makers, and industrial coating makers use paints.

The corrosion resistance of a metal pigment in water or aqueous paint is hereinafter referred to as "storage stability" so that it can be distinguished from aging stability of a metal pigment itself is.

JP-A-2000-7939 discloses metal particles containing a molybdate pigment. JP-A-6-57171 discloses a method of coating the surfaces of aluminum flakes with a molybdic acid film. However, even in the prior art disclosed in these earlier applications, the problems that the aging stability of an aluminum pigment itself and the color-tone of an aluminum pigment decrease are inevitable.

BRIEF SUMMARY OF THE INVENTION

An object of the present invention is to provide a metal pigment composition overcoming drawbacks in the prior art as mentioned above. More specifically, the object of the present invention is to provide a metal pigment composition having the characteristics that aging stability is excellent, reductions of brightness, masking and flip flop appearance are little, and storage stability is excellent.

DETAILED DESCRIPTION OF THE INVENTION

The present inventors have found that excellent storage stability and excellent color tone of a metal pigment can be simultaneously obtained by employing a metal pigment composition containing an organic molybdenum compound or a metal pigment composition containing an organic molybdenum compound and at least one agent selected from the group consisting of an anti-oxidizing agent, an anti-reducing agent and a photostabilizer. They have found that such a metal pigment composition further ensures excellent aging stability of a metal pigment. Based on the findings, the present invention has been accomplished.

More specifically, the present invention provides the followings.

(1) A metal pigment composition containing a metal pigment whose surface is treated with at least one of organic molybdenum compounds.

(2) The metal pigment composition according to item (1), further containing at least one agent selected from the group consisting of an anti-oxidizing agent, an anti-reducing agent and a photostabilizer.

(3) The metal pigment composition according to item (1) or (2), in which the metal pigment is composed of aluminum powder.

(4) The metal pigment composition according to item (1) or (2), in which the at least one of organic molybdenum compounds contains at least one of amine molybdate salts.

(5) The metal pigment composition according to item (4), in which the amine constituting the amine molybdate salts is at least one of amine compounds represented by the following general formula (1).

[Formula 1]

(where R1, R2 and R3 may be the same or different and each represents a hydrogen atom or a monovalent or divalent hydrocarbon group of 1 to 30 carbon atoms optionally containing an ether bond, an ester bond, a hydroxyl group, a carbonyl group and/or a thiol group; R1 and R2 may be combined with each other to form a 5-membered or 6-membered cycloalkyl group, or may be combined with a nitrogen atom to form a 5-membered or 6-membered ring that can contain an additional nitrogen atom or oxygen atom as a linkage atom, or alternatively, R1, R2 and R3 may be combined with one another to form a multi-membered polycyclic composition that can contain one or more additional nitrogen atoms and/or oxygen atoms as linkage atoms; and n is a number from 1 to 2).

(6) The metal pigment composition according to item (5), in which the amine compound is a secondary amine having one or two of hydrocarbon groups of 3 to 24 carbon atoms.

(7) The metal pigment composition according to item (1) or (2), in which the at least one of organic molybdenum compounds contains at least one of amine molybdate salts and at least one of organic molybdenum compounds except the amine molybdate salts.

(8) The metal pigment composition according to item (7), in which the organic molybdenum compounds except the amine molybdate salts are a compound represented by the following formula (2):

[Formula 2]

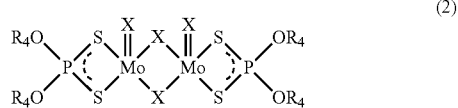

(where $R_4$ may be the same or different and represents an organic group of 1 to 24 carbon atoms; and X is an S atom or an O atom).

(9) The metal pigment composition according to item (7), in which the organic molybdenum compounds except the amine molybdate salts are a compound represented by the following formula (3):

[Formula 3]

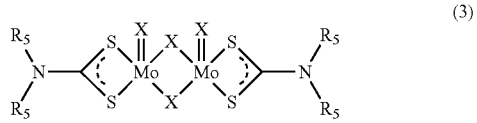

(3)

(where $R_5$ may be the same or different and represents an organic group of 1 to 24 carbon atoms; and X is an S atom or an O atom).

(10) The metal pigment composition according to item (1) or (2), in which the amount of the at least one of organic molybdenum compounds used for treatment of the surface of the metal pigment is 0.01 to 10 parts by weight relative to 100 parts by weight of the metal pigment.

(11) The metal pigment composition according to item (2), in which the anti-oxidizing agent is at least one compound selected from the group consisting of phenol compounds, phosphorus compounds and sulfur compounds.

(12) The metal pigment composition according to item (2), in which the anti-reducing agent is at least one compound selected from the group consisting of nitro compounds and halogen compounds.

(13) The metal pigment composition according to item (2), in which the photostabilizer is at least one compound selected from the group consisting of benzotriazole compounds, benzophenone compounds, salicylate compounds, cyanoacrylate compounds, oxalic acid derivatives, hindered amine compounds (HALS) and hindered phenol compounds.

(14) The metal pigment composition according to item (2), in which a total amount of the at least one agent selected from the group consisting of an anti-oxidizing agent, an anti-reducing agent and a photostabilizer is 0.01 to 10 parts by weight relative to 100 parts by weight of the metal pigment.

A metal pigment composition according to the present invention can be obtained by blending at least one of organic molybdenum compounds and a metal pigment or by blending at least one of organic molybdenum compounds, at least one agent selected from the groups consisting of an anti-oxidizing agent, an anti-reducing agent and a photostabilizer, and a metal pigment. The metal pigment composition of the present invention is excellent in aging stability. When the metal pigment composition is used in an aqueous paint, it can provide a paint film excellent in good storage stability, brightness, masking, and flip-flop.

Next, the present invention will be described in more details with reference to preferred embodiments.

As the metal pigment to be used in the present invention, a powder of a less-noble metal such as aluminum, zinc, iron, magnesium, copper or nickel, or an alloy thereof is preferred. An aluminum powder which is frequently used for metallic powder is preferable, particularly. The aluminum powder to be used in the present invention is preferably formed of particles having the surface appearance, the particle size, and the shape which are required for a metallic pigment with surface glossiness, whiteness and so on. The shape of the particles is preferably a squamous shape. For example, the particles having a thickness within the range of 0.01 to 5 µm and a length or width within the range of 1 to 60 µm are preferable. The aspect ratio thereof preferably falls within the range of 10 to 250. The aspect ratio used herein is a value obtained by dividing an average major axis of particles of squamous aluminum powder by an average thickness of the particles of the aluminum powder. The purity of aluminum powder is not particularly limited; however, the purity of aluminum powder is 99.5% or more when used in paint. Commercially available aluminum powder usually has paste form, and this paste-form aluminum powder is preferably employed.

The organic molybdenum compounds used in the present invention are typically represented by those used as lubricant oil additive. A particularly preferable compound of them is an amine molybdate salt, which is a compound obtained by the reaction between an inorganic molybdenum compound and an amine compound.

As the inorganic molybdenum compound, molybdenum trioxide or a hydrate thereof, and molybdic acid or an alkaline salt thereof can be used. However, when such an inorganic molybdenum is reacted with an amine compound, it is dissolved (dispersed) in water. Therefore, it is preferable to contain an alkaline salt of molybdic acid to the extent that the whole amounts are uniformly dissolved in water. The inorganic molybdenum compound is not necessary to be completely dissolved in water. Even in a dispersion state, the reaction can proceed. The examples of the alkaline salt of molybdic acid include a sodium salt, a potassium salt and an ammonium salt thereof.

Furthermore, amine of the amine molybdate salts, which is represented by the following formula (1), includes straight primary amines such as ethylamine, propylamine, butylamine, hexylamine, octylamine, laurylamine, tridecylamine and stearylamine; branched primary amines such as isopropylamine, isobutylamine, 2-ethylhexylamine and branched tridecylamine; straight secondary amines such as dimethylamine, diethylamine, dipropylamine, dibutylamine, dihexylamine, dioctylamine, dilaurylamine, ditridecylamine and distearylamine; branched secondary amines such as diisopropylamine, diisobutylamine, di-2-ethylhexylamine and branched ditridecylamine; asymmetric secondary amines such as methylbutylamine, ethylbutylamine, ethylhexylamine, ethyllaurylamine, ethylstearylamine, isopropyloctylamine and isobutyl-2-ethylhexylamine; straight tertiary amines such as trimethylamine, triethylamine, tripropylamine, tributylamine, trioctylamine, trilaurylamine, tritridecylamine and tristearylamine; branched tertiary amines such as triisopropylamine, triisobutylamine, tri-2-ethylhexylamine and branched tritridecylamine; and tertiary amines having hydrocarbon groups in combination such as dimethyloctylamine, dimethyllaurylamine, dimethylstearylamine, and diethyllaurylamine. Other than these, mention may be made of amines having an alkenyl group such as allylamine, diallylamine, triallylamine and N,N-dimethylallylamine; alicyclic primary amines such as cyclohexylamine and 2-methylcyclohexylamine; primary amines having an aromatic-ring substituent such as benzylamine and 4-methylbenzylamine; alicyclic secondary amines such as dicyclohexylamine and di-2-methylcyclohexylamine; secondary amines having an aromatic-ring substituent such as dibenzylamine and di-4-methylbenzylamine; asymmetric secondary amines such as cyclohexyl-2-ethylhexylamine, cyclohexylbenzylamine, stearylbenzylamine and 2-ethylhexylbenzylamine; alicyclic tertiary amines such as dimethylbenzylamine, dimethylcyclohexylamine and tricyclohexylamine; tertiary amines having an aromatic-ring substituent such as tribenzylamine and tri-4-methylbenzylamine; morpholine, 3-methoxypropylamine, 3-ethoxypropylamine, 3-butoxypropylamine, 3-decyloxypropylamine, 3-lauryloxypropylamine, monoethanolamine, diethanolamine, monoisopropanolamine, monopropanolamine, butanolamine, triethanolamine, N,N-dimethylethanolamine, N-methylethanolamine, N-ethylethanolamine, N-propylethanolamine, N-isopropylethanolamine, N-butylethanolamine, N-cyclohexyl-N-methylaminoethanol, N-benzyl-N-propylaminoethanol, N-hydroxyethylpyrrolidine, N-hydroxyethylpiperazine, N-hydroxyethylmorpholine, ethylenediamine, 1,2-propanediamine, 1,3-propanediamine, N,N-dimethyl-1,3-propanediamine, N-cyclohexyl-1,3-propanediamine, N-decyl-1,3-propanediamine, N-isotridecyl-1,3-propanediamine, N,N-dimethylpiperazine, N-methoxyphenylpiperazine, N-methylpiperidine, N-ethylpiperidine, quinuclidine and mixtures thereof.

Of them, particularly the preferable examples include stearylamine, di-2-ethylhexylamine, dioctylamine, straight or branched ditridecylamine, distearylamine, straight or branched tritridecylamine, tristearylamine, morpholine, 3-ethoxypropylamine, N,N-dimethylethanolamine, triethanolamine and so on.

[Formula 4]

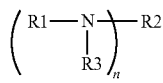
(1)

(where R1, R2 and R3 may be the same or different and each represents a hydrogen atom or a monovalent or divalent hydrocarbon group of 1 to 30 carbon atoms optionally containing an ether bond, an ester bond, a hydroxyl group, a carbonyl group and/or a thiol group; R1 and R2 may be combined with each other to form a 5-membered or 6-membered cycloalkyl group, or may be combined with a nitrogen atom to form a 5-membered or 6-membered ring that can contain an additional nitrogen atom or oxygen atom as a linkage atom, or alternatively, R1, R2 and R3 may be combined with one another to form a multi-membered polycyclic composition that can contain one or more additional nitrogen atoms and/or oxygen atoms as linkage atoms; and n is a number from 1 to 2).

Furthermore, of the organic molybdenum compounds to be used in the present invention, organic molybdenum compounds except amine molybdate salts are represented by the general formula (1) and the following formulas (2) and (3). The examples thereof further include MoDTPs (molybdenum dithiophosphates) represented by the following formula (4) and MoDTCs (molybdenum dithiocarbamates) represented by the following formula (5).

[Formula 5]

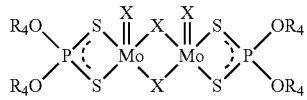
(2)

(where $R_4$ may be the same or different and represents an organic group of 1 to 24 carbon atoms; and X is an S atom or an O atom).

[Formula 6]

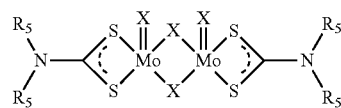
(3)

(where $R_5$ may be the same or different and represents organic group of 1 to 24 carbon atoms; and X is an S atom or an O atom).

[Formula 7]

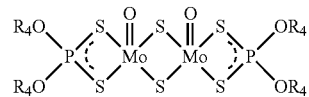
(4)

(where $R_4$ may be the same or different and represents an organic group of 1 to 24 carbon atoms).

[Formula 8]

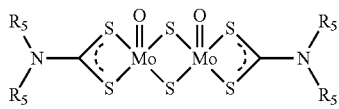
(5)

(where $R_5$ may be the same or different and represents an organic group of 1 to 24 carbon atoms).

In the formulas (2) and (3) herein, organic groups $R_4$ an $R_5$ are hydrocarbon groups such as a hydroxyl group, an aldehyde group, a carbonyl group and a carboxyl group, or hydrocarbon group having an ether bond, a thioether bond and/or an ester bond. In particular, the combination of the compound obtained by the reaction between the molybdenum compound and the amine compound and MoDTC in which $R_5$ is a hydrocarbon group of 1 to 24 carbon atoms are preferably used.

As the compounds represented by the formulas (4) and (5), for example, MoDTP (trade name: "Adeka Sakura-lube 300" manufactured by Adeka Corporation) and MoDTC (trade name: "Adeka Sakura-lube 165" manufactured by Adeka Corporation) may be used.

When an amine molybdate salt of an organic molybdenum compound and an organic molybdenum compound except the amine molybdate salt are used, the ratio of the amine molybdate salt of an organic molybdenum compound (which is obtained though the reaction between the above inorganic molybdenum compound and the amine compound) relative to the organic molybdenum compound except the amine molybdate salt is not particularly limited. However, the ratio is preferably 10:5 or less.

The total additional amount of the organic molybdenum compound falls within the range of 0.01 to 10 wt % of the weight of a metal pigment, preferably 0.01 to 2 wt %.

As the anti-oxidizing agent to be used in the present invention, use may be typically made of a phenol compound, a phosphorus compound or a sulfur compound. Examples of preferable compounds thereof include 2,6-di-t-butylphenol, 2,4-dimethyl-6-t-butylphenol, butylhydroxytoluene (BHT), 2,6-di-t-butyl-4-ethylphenol, 2,4,6-tri-t-butylphenol, 2,6-di-t-butyl-4-s-butylphenol, butylhydroxyanisole (BHA), tocopherol, 2,6-di-t-butyl-4-hydroxymethylphenol, n-octadecyl-β-(4'-hydroxy-3'5'-di-t-butylphenyl)propionate, 2-t-butyl-4-(N,N-dimethylaminomethyl)phenol, 3,5-di-t-butyl-4-hydroxybenzylphosphonate-diethylester, propyl gallate, octyl gallate, lauryl gallate, 2,2'-methylenebis(4-methyl-6-t-butylphenol), 2,2'-methylenebis(4-ethyl-6-t-butylphenol), 4,4'-methylenebis(2,6-di-t-butylphenol), 2,2'-methylenebis(4-methyl-6-cyclohexylphenol), 2,2'-dihydroxy-3,3'-di(α-methylcyclohexyl)-5,5'-dimethyldiphenylmethane, 2,2'-dimethylene-bis-(6-α-methyl-benzyl-p-cresol), 2,2'-ethylidene-bis(4,6-di-t-butylphenol), 2,2'-butylidene-bis(4-methyl-6-t-butylphenol), 4,4'-butylidenebis(3-methyl-6-t- butylphenol), triethyleneglycol-N-bis-3-(3-t-butyl-4-hydroxy-5-methylphenyl)propionate, 1,6-hexanediolbis[3-(3,5-di-t-butyl-4-hydroxyphenyl)propionate, bis[2-t-butyl-4-methyl-6-(3-t-butyl-5-methyl-2-hydroxybenzyl)phenyl] terephthalate, 3,9-bis[2-{3-(3-t-butyl-4-hydroxy-5-methylphenyl)propionyloxy}-1,1-dimethylethyl]-2,4,8,10-tetraoxaspiro[5,5]undecane, 4,4'-thiobis(6-t-butyl-m-cresol), 4,4'-thiobis(3-methyl-6-t-butylphenol), 2,2'-thiobis(4-methyl-6-t-butylphenol), bis(3,5-di-t-butyl-4-hydroxybenzyl)sulfide, 4,4'-di and tri-thiobis(2,6-di-t-butylphenol), 2,2-thiodiethylenebis-[3(3,5-di-t-butyl-4-hydroxyphenyl)propionate], 2,4-bis(n-octylthio)-6-(4-hydroxy-3'5'-di-t-butylanilino)-1,3,5-triazine, N,N'-hexamethylenebis-(3,5-di-t-butyl-4-hydroxyhydrocinnamamide, N,N'-bis[3-(3,5-di-t-butyl-4-hydroxyphenyl)propionyl]hydrazine, calcium(3,5-di-t-butyl-4-hydroxybenzylmonoethylphosphonate), alkylated bisphenol, 1,1,3-tris(2-methyl-4-hydroxy-5-t-butylphenyl)butane, 1,3,5-trimethyl-2,4,6-tris(3,5-di-t-butyl-4-hydroxybenzyl)benzene, tris(3,5-di-t-butyl-4-hydroxyphenyl)isocyanurate, tris(3,5-di-t-butyl-4-hydroxybenzyl)isocyanurate, 1,3,5-tris(4-t-butyl-3-hydroxy-2,6-dimethylbenzyl)isocyanurate, 1,3,5-tris-2[3(3,5-di-t-butyl-4-hydroxyphenyl)propionyloxy]-ethylisocyanate, tetrakis[methylene-3-(3',5'-di-t-butyl-4-hydroxyphenyl)propionate]methane, butyric acid, 3,3-bis(3-t-butyl-4-hydroxyphenyl)ethylene ester, triphenyl phosphite, diphenylnonylphenyl phosphite, tris-(2,4-di-t-butylphenyl)phosphite, trisnonylphenyl phosphite, mixture of tris(mono- and dinonylphenyl)phosphate, diphenylisooctyl phosphite, 2,2'-methylenebis(4,6-di-t-butylphenyl)octyl phosphite, diphenylisodecyl phosphite, diphenylmono(tridecyl)phosphite, 2,2'-ethylidenebis(4,6-di-t-butylphenol) fluoro phosphite, phenyldiisodecyl phosphite, phenyldi(tridecyl)-phosphite, tris(2-ethylhexyl)phosphite, tris(isodecyl)phosphite, tris(tridecyl)phosphite, dibutylhydrogen phosphite, trilauryl trithiophosphite, tetrakis(2,4-di-t-butylphenyl)-4,4'-biphenylenediphosphonite, 4,4'-isopropylidenediphenolalkyl(C12-C15)phosphite, 4,4'-butylidenebis(3-methyl-6-t-butylphenyl)di-tridecylphosphite, distearyl-pentaerythritol diphosphite, bis(nonylphenyl)pentaerythritol diphosphite, bis(2,4-di-t-butylphenyl)pentaerythritol diphosphite, cyclic neopentanetetraylbis(2,6-di-t-butyl-4-methylphenyl)phosphite, phenyl-bisphenol A-pentaerythritol diphosphite, tetraphenyldipropylene glycol diphosphite, 1,1,3-tris(2-methyl-4-di-tridecylphosphite-5-t-butylphenyl)butane, tetraphenyltetra(tridecyl)pentaerythritol tetraphosphite, zinc dialkyldithiophosphate (ZnDTP), 3,4,5,6-dibenzo-1,2-oxaphosphane-2-oxide, 3,5-di-t-butyl-4-hydroxybenzyl phosphite-diethyl ester, dehydrogenated bisphenol A phosphite polymer, dilauryl-3,3'-thiodipropionic acid ester (DLTTDP), ditridecyl-3,3'-thiodipropionic acid ester, dimyristyl-3,3'-thiodipropionic acid ester (DMTDP), distearyl-3,3'-thiodipropionic acid ester (DSTDP), lauryl stearyl-3,3'-thiodipropionic acid ester, pentaerythritol tetra(β-lauryl-thiopropionate)ester, stearyl thiopropionamide, bis[2-methyl-4-(3-n-alkyl(C12-C14)thiopropionyloxy)-5-t-butylphenyl]sulfide, dioctadecyl disulfide, 2-mercaptobenzimidazole, 2-mercapto-6-methylbenzimidazole and 1,1'-thiobis(2-naphthol).

As the anti-reducing agents, a nitro compound or a halogen compound is typically used. The preferable compounds thereof include nitroparaffins of nitromethane, nitroethane, nitrobutane, and so on; nitrobenzene; and nitrobenzenesulfonic acid compounds; and so on.

As the photostabilizers, a benzotriazole compound, a benzophenone compound, a salicylate compound, a cyanoacrylate compound, an oxalic acid derivative, a hindered amine compound (HALS), and a hindered phenol compound are typically used. Some of them may be used as the aforementioned anti-oxidizing agent. Examples of preferable compounds thereof include 2-(2'-hydroxy-5'-methylphenyl)benzotriazole, 3",4",2-(2'-hydroxy-5'-t-octylphenyl) benzotriazole, 2-(2'-hydroxy-4'-t-octoxyphenyl) benzotriazole, 2-(2'-hydroxy-3',5'-di-t-butylphenyl) benzotriazole, 2-(2'-hydroxy-3',5'-di-t-amylphenyl) benzotriazole, 2-(2'-hydroxy-3'-dodecyl-5'-methylphenyl) benzotriazole, 2-(2'-hydroxy-3',5'-bis(α,α-dimethylbenzyl) phenyl benzotriazole, 2-[2'-hydroxy-3'-(3",4",5",6"-tetraphthalimidemethyl)-5'-methylphenyl]benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2,2'-methylenebis[4-(1,1,3,3-tetramethylbutyl)-6-(2H-benzotriazol-2-yl)phenol, a condensation product of methyl-3-[3-t-butyl-5-(2H-benzotriazol-2-yl)-4-hydroxyphenylpropionate and polyethylene glycol (molecular weight: about 300), 2,4-dihydroxybenzophenone, 2-hydroxy-4-methoxybenzophenone, 2-hydroxy-4-n-octoxybenzophenone, 2-hydroxy-4-n-dodecyloxybenzophenone, 2-hydroxy-4-benzyloxybenzophenone, 2,2'-dihydroxy-4-methoxybenzophenone, 2-hydroxy-4-methoxy-2'-carboxybenzophenone, 2-hydroxy-4-methoxy-5-sulfoxybenzophenone, 2,2'-dihydroxy-4,4'-dimethoxybenzophenone, 2,2',4,4'-tetrahydroxybenzophenone, 2,2'-dihydroxy-4,4'-dimethoxy-5-sodiumsulfoxybenzophenone, bis(5-benzoyl-4-hydroxy-2-methoxyphenyl)methane, a polymer of 4-(2-acryloyloxyethoxy)-2-hydroxybenzophenone, a mixture of 2,2'-dihydroxy-4,4'-dimethoxybenzophenone and other benzophenone with 4 substituents, phenyl salicylate, 2,5-di-t-butyl-4-hydroxybenzoic acid-n-hexadecyl ester, 4-t-butylphenyl salicylate, 4-t-octylphenyl salicylate, 2,4-di-t-butylphenyl-3',5'-di-t-butyl-4'-hydroxybenzoate, ethyl(β,β-diphenyl)cyano acrylate, 2-ethylhexyl(β,β-diphenyl) cyanoacrylate, 2-ethoxy-2'-ethyloxalic acid bisanilide, 2-ethoxy-5-t-butyl-2'-ethyloxalic acid bisanilide, an oxalic acid anilide derivative, an indole derivative, an azomethine derivative, phenyl-4-piperidinyl carbonate, [4-(4-hydroxy-3,5-di-t-butylphenyl)propionyl]-N-(4-hydroxy-3,5-di-t-butylphenyl)methyl-2,2,6,6-tetramethylpiperidine, 1,1'-(1,2-ethane diyl)bis(3,3,5,5-tetramethylpiperazinone), bis(2,2,6,6-tetramethyl-4-piperidinyl)sebacate, bis-[N-methyl-2,2,6,6-tetramethyl-4-piperidinyl sebacate, bis(1,2,2,6,6-pentamethyl-4-piperidyl)-2-(3,5-di-t-butyl-4-hydroxybenzyl)-2-n-butyl malonate, a condensation product of 1,2,3,4-butane carboxylic acid, 2,2,6,6-tetramethyl-4-piperidinol and tridecyl alcohol, a condensation product of 1,2,3,4-butane carboxylic acid, 1,2,2,6,6-pentamethyl-4-piperidinol and tridecyl alcohol, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, poly[[6-(1,1,3,3-tetramethylbutylamino)-1,3,5-triazine-2,4-diyl][(2,2,6,6-tetramethylpiperidine)imino]-hexamethylene[(2,2,6,6-tetramethylpiperidyl)imino]], poly[6-morpholino-s-triazine-2,4-diyl-2,2,6,6-tetramethylpiperidyl iminohexamethylene][2,2,6,6-tetramethylpiperidylimino]], a condensation product of 1,2,3,4-butane tetracarboxylic acid, 2,2,6,6-tetramethyl-4-piperidinol and β,β,β',β'-tetramethyl-3,9-(2,4,8,10-tetraoxaspiro[5,5]undecane)diethanol, 1,6-hexamethylenebis(N,N-dimethylsemicarbazide), and 1,1,1',1'-tetramethyl-4,4'-(methylene-di-p-phenylene) disemicarbazide.

A metal pigment composition according to the present invention can be obtained by containing a metal pigment treated with at least one of organic molybdenum compounds or by blending a metal pigment treated with at least one of organic molybdenum compounds and at least one agent selected from the group consisting of an anti-oxidizing agent, an anti-reducing agent and a photostabilizer.

The organic molybdenum compound, the anti-oxidizing agent, the anti-reducing agent and the photostabilizer which are used in the present invention may be added to a raw-material metal powder during a pulverization process by a ball mill or to a metal powder in a slurry state (which is obtained by adding a large amount of solvent to the metal powder), or alternatively, to a metal powder in a paste state (which is obtained by adding a small amount of solvent to the metal powder) and kneaded. The organic molybdenum compound and anti-oxidizing agent, anti-reducing agent or photostabilizer may be directly added to a metal pigment composition or added thereto after being diluted with a solvent. To obtain a homogenous mixture, it is preferable that such a compound is diluted with a solvent and then added thereto. Furthermore, if necessary, a surfactant, a silane coupling agent, a titanium coupling agent, a phosphoric acid ester and an acrylic resin having a phosphoric acid ester group in a side chain may be added to a metal pigment composition according to the present invention.

As the solvent used in preparing the metal pigment composition according to the present invention, a hydrophilic solvent or a hydrophobic solvent may be used. However, a hydrophobic solvent is more preferable. The examples of the hydrophilic solvent include alcohols such as methanol, ethanol, propanol, butanol and isopropanol; cellosolves such as ethylene glycol monoethyl ether, ethylene glycol monobutyl ether, propylene glycol monoethyl ether, propylene glycol monomethyl ether and dipropylene glycol monomethyl ether; and glycols such as propylene glycol, polyoxyethylene glycol, polyoxypropylene glycol and ethylene propylene glycol. Examples of the hydrophobic solvent include mineral spirit, solvent naphtha, LAWS (low aromatic white spirit), HAWS (high aromatic white spirit), toluene and xylene. These may be used singly or in a mixture.

When preparation is performed in a slurry state, a metal powder is contained in the slurry in a concentration of 1 to 50 wt %, and preferably 10 to 30 wt %. When preparation is kneaded in the paste-state, a metal power is added to the paste in a concentration of 50 to 95 wt %, and preferably 60 to 85 wt % and kneaded.

The addition of the organic molybdenum compound is performed in an amount of 0.01 to 10 wt % relative to the weight of the metal powder, and preferably 0.01 to 2 wt %. In this regard, the addition after these are previously dissolved or dispersed in mineral oil or hydrophobic solvent is preferable.

The total addition amount of at least one agent selected from the group consisting of an anti-oxidizing agent, an anti-reducing agent and a photostabilizer is 0.01 to 10 wt % of the weight of a metal powder, and preferably, 0.01 to 5 wt %. In this regard, the addition after these are previously dissolved or dispersed in hydrophilic solvent or hydrophobic solvent is preferable.

The mixture is stirred at 0 to 160° C., preferably 10 to 100° C. for one minute to 24 hours, preferably for 2 minutes to 8 hours. When the solvent is contained in a large amount, the solvent is removed to adjust the final content of aluminum powder to a desired value, i.e. 40 to 90%. The aluminum pigment composition thus obtained may be subjected to an aging process, which is performed at 40° C. to 120° C., preferably 50° C. to 110° C. for 6 hours to 3 months, preferably for one day to 30 days. When the aging process is performed at a higher temperature or for a longer period than the aforementioned range, the color tone of the composition may deteriorate.

When the metal pigment composition obtained by the present invention is added to an aqueous paint in which the resins of the component forming a paint film are dissolved or dispersed in the medium primarily containing water, a metallic aqueous paint can be obtained. In this regard, it is preferable that the mixture of an organic molybdenum compound and a metal pigment or the mixture of an organic molybdenum compound, at least one agent selected from the group consisting of an anti-oxidizing agent, an anti-reducing agent and a photostabilizer, and a metal pigment is prepared, and then is added to an aqueous paint. The examples of the above resins include an acrylic resin, a polyester resin, a polyether resin, an epoxy resin and a fluororesin. If necessary, a melamine hardener, an isocyanate hardener and a resin such as an urethane dispersion may be used in combination. Furthermore, a silane coupling agent, a titanium coupling agent, organophosphate, organic phosphite, heteropolyanion and phosphosilicate generally added to paints may be used in combination.

The examples of the present invention will be described below.

EXAMPLE 1

To 135 g of a commercially available aluminum paste (trade name: "GX-3100" (average particle diameter: 10.5 μm, non-volatile content: 74%) manufactured by Asahi Chemicals Corporation), a dioctylamine molybdate salt was added in an amount of 1.0 part by weight relative to 100 parts by weight of aluminum flake. The mixture was stirred at 25° C. for 2 minutes.

EXAMPLE 2

To 135 g of a commercially available aluminum paste (trade name: "GX-3100" (average particle diameter: 10.5 μm, non-volatile content: 74%) manufactured by Asahi Chemicals Corporation), a tritridecylamine molybdate salt was added in an amount of 0.3 parts by weight relative to 100 parts by weight of aluminum flake. The mixture was stirred at 25° C. for 2 minutes.

EXAMPLE 3

To 135 g of a commercially available aluminum paste (trade name: "GX-3100" (average particle diameter: 10.5 μm, non-volatile content: 74%) manufactured by Asahi Chemicals Corporation), a dioctylamine molybdate salt was added in an amount of 0.5 parts by weight relative to 100 parts by weight of aluminum flake. The mixture was stirred at 25° C. for 2 minutes and thereafter subjected to an aging process performed at 90° C. for one day.

EXAMPLE 4

To 135 g of a commercially available aluminum paste (trade name: "GX-3100" (average particle diameter: 10.5 μm, non-volatile content: 74%) manufactured by Asahi Chemicals Corporation), a dioctylamine molybdate salt was added in an amount of 0.1 part by weight relative to 100 parts by weight of aluminum flake. The mixture was stirred at 25° C. for 2 minutes and subjected to an aging process performed at 50° C. for 30 days.

EXAMPLE 5

To 68 g of a commercially available aluminum paste (trade name: "GX-3100" (average particle diameter: 10.5 μm, non-volatile content: 74%) manufactured by Asahi Chemicals Corporation), 232 g of mineral sprit was added in order to obtain slurry of 16.7% in concentration. To the slurry, a dioctylamine molybdate salt was added in an amount of 0.5 parts by weight relative to 100 parts by weight of aluminum flake. The mixture was stirred at 40° C. for 3 hours. Thereafter, the slurry was filtrated to obtain an aluminum pigment composition containing a non-volatile content of 60 to 70%.

EXAMPLE 6

To 135 g of a commercially available aluminum paste (trade name: "GX-3100" (average particle diameter: 10.5 μm, non-volatile content: 74%) manufactured by Asahi Chemicals Corporation), a dioctylamine molybdate salt and MoDTC (trade name: "Adeka Sakura-lube 165" manufactured by Adeka Corporation) were added in an amount of 1.0 part by weight and 0.5 parts by weight, respectively, relative to 100 parts by weight of aluminum flake. The mixture was stirred at 25° C. for 2 minutes.

EXAMPLE 7

To 135 g of a commercially available aluminum paste (trade name: "GX-3100" (average particle diameter: 10.5 μm, non-volatile content: 74%) manufactured by Asahi Chemicals Corporation), a dioctylamine molybdate salt and MoDTP (trade name: "Adeka Sakura-lube 300" manufactured by Adeka Corporation) were added in an amount of 1.0 part by weight and 0.1 part by weight, respectively, relative to 100 parts by weight of aluminum flake. The mixture was stirred at 25° C. for 2 minutes.

EXAMPLE 8

To 135 g of a commercially available aluminum paste (trade name: "GX-3100" (average particle diameter: 10.5 μm, non-volatile content: 74%) manufactured by Asahi Chemicals Corporation), a dioctylamine molybdate salt and BHT (trade name: "Yoshinox BHT" manufactured by API Corporation) were added in an amount of 0.4 parts by weight and 0.05 parts by weight, respectively, relative to 100 parts by weight of aluminum flake. The mixture was stirred at 40° C. for 5 minutes. Thereafter, the mixture was subjected to an aging process performed at 50° C. for 2 days.

EXAMPLE 9

To 135 g of a commercially available aluminum paste (trade name: "GX-3100" (average particle diameter: 10.5 μm, non-volatile content: 74%) manufactured by Asahi Chemicals Corporation), a dioctylamine molybdate salt was added in an amount of 0.5 parts by weight relative to 100 parts by weight of aluminum flake. The mixture was stirred at 40° C. for 5 minutes. Further, a mixture of a hindered phenol anti-oxidizing agent and a phosphorus anti-oxidizing agent (trade name: "IRGANOXB 220", manufactured by Ciba Speciality Chemicals Corporation) was added in an amount of 1.0 part by weight relative to 100 parts by weight of aluminum flake. The mixture was stirred at 40° C. for 5 minutes. Thereafter, the mixture was subjected to an aging process performed at 90° C. for 24 hours.

EXAMPLE 10

To 135 g of a commercially available aluminum paste (trade name: "GX-3100" (average particle diameter: 10.5 μm, non-volatile content: 74%) manufactured by Asahi Chemicals Corporation), a dioctylamine molybdate salt was added in an amount of 0.4 parts by weight relative to 100 parts by weight of aluminum flake. The mixture was stirred at 30° C. for 10 minutes. Further, ZnDTP (trade name: "Adeca, Kikulube Z-112" manufactured by Adeka Corporation) was added in an amount of 4.0 parts by weight relative to 100 parts by weight of aluminum flake. The mixture was stirred at 50° C. for 10 minutes.

EXAMPLE 11

To 135 g of a commercially available aluminum paste (trade name: "GX-3100" (average particle diameter: 10.5 μm, non-volatile content: 74%) manufactured by Asahi Chemicals Corporation), a tritridecylamine molybdate salt was added in an amount of 0.4 parts by weight relative to 100 parts by weight of aluminum flake. The mixture was stirred at 30° C. for 10 minutes. Further, a nitro compound (trade name: "POLYMINE L NEW" manufactured by Nippon Kayaku Co., Ltd) was added in an amount of 1.0 part by weight relative to 100 parts by weight of aluminum flake. The mixture was stirred at 30° C. for 10 minutes.

EXAMPLE 12

To 135 g of a commercially available aluminum paste (trade name: "GX-3100" (average particle diameter: 10.5 μm, non-volatile content: 74%) manufactured by Asahi Chemicals Corporation), a tritridecylamine molybdate salt was added in an amount of 0.3 parts by weight relative to 100 parts by weight of aluminum flake. The mixture was stirred at 30° C. for 10 minutes. Further, a hindered amine compound (trade name: "Sanol LS-765" manufactured by Sankyo Lifetech Co., Ltd.) was added in an amount of 0.03 parts by weight relative to 100 parts by weight of aluminum flake. The mixture was stirred at 30° C. for 5 minutes.

COMPARATIVE EXAMPLE 1

An aluminum paste (trade name: "GX-3100" (average particle diameter: 10.5 μm, non-volatile content: 74%) manufactured by Asahi Chemicals Corporation) containing neither an organic molybdenum compound nor a mixture of an organic molybdenum compound and at least one agent selected from the group consisting of an anti-oxidizing agent, an anti-reducing agent and a photostabilizer will be described as "untreated aluminum".

COMPARATIVE EXAMPLE 2

First, 135 g of a commercially available aluminum paste (trade name: "GX-3100" (average particle diameter: 10.5 μm, non-volatile content: 74%) manufactured by Asahi Chemicals Corporation) was dispersed in propylene glycol monomethyl ether. To this dispersion solution, ammonium molybdate dissolved in water was added such that ammonium molybdate was contained in an amount of 1.0 part by weight relative to 100 parts by weight of aluminum flake. The mixture was stirred at 40° C. for 3 hours. Thereafter, the slurry was filtrated to obtain an aluminum pigment composition having a non-volatile component of 60 to 70%.

Aqueous metallic paints were produced using the aluminum pigment compositions of Examples 1 and 12 and Comparative Examples 1 and 2 in accordance with the following formulas:

Aluminum pigment composition (Examples 1 to 12, Comparative Examples 1 and 2)

| | |
|---|---|
| Aluminum content: | 7.35 g |
| Mineral spirit | 7.35 g |
| Propylene glycol monomethyl ether | 9.80 g |
| Water-soluble acrylic resin (trade name: "Aqueous pramease #200" manufactured by Origin Electric Co., Ltd.) | 180 g |
| Purified water | 45 g |

The aqueous metallic paints prepared were evaluated for the following characteristics.

[Evaluation 1 (Storage Stability)]

An aqueous metallic paint (200 g) was taken and transferred to a flask. The flask was bathed in a water vessel kept at 40° C. Hydrogen gas was allowed to generate up to 72 hours. The accumulation amount of hydrogen gas was determined. Storage stability in the paint was evaluated based on the generation amount of gas and expressed by the following indexes:

○: less than 1.0 ml/g
Δ: 1.0 or more and less than 5.0 ml/g
X: 5.0 ml/g or more.

[Evaluation 2 (Color Tone of Paint Film)]

The aforementioned paints were applied to prepare paint films, which were evaluated for brightness, flip-flop characteristics, masking characteristics and granularity.

Brightness was evaluated by means of a laser metallic-appearance measurement device, R-cope (LMR-200) (manufactured by Kansai Paint Co., Ltd.). Optical conditions are as follows. Light was supplied from a laser light source and applied to a paint film at an incidence angle of 450. Refection light was captured by a photoreceptor placed at acceptance-angles of 0 and −35°. As a measurement value, the value IV was used, which was obtained at an acceptance angle of −35° at which the maximum light intensity of reflected laser light can be obtained except a mirror-surface reflection region at which light is directly reflected at the surface of the paint film. The IV value is a parameter changing in proportion to the intensity of regular-reflection light from the paint film and represents the degree of light brightness. The brightness was evaluated as follows:

◎: 10 or more higher than untreated aluminum
○: difference from untreated aluminum is less than 10
X: 10 or more lower than untreated aluminum.

Flip-flop characteristics were evaluated by a multi-angle color meter manufactured by Suga Test Instruments Co., Ltd. Light is supplied from a light source and applied to a sample at an incidence angle of 45°. The reflection light was captured at acceptance-angles of 30 and 80°. Based on the inclination of the intensity (L values in terms of log) of reflection light, an F/F value was obtained. The F/F value is a parameter changing in parallel with the degree of orientation of a metal pigment and represents the degree of flip-flop characteristics. The flop-flop characteristics was evaluated as follows:

◎: 0.05 or higher than untreated aluminum
○: difference from untreated aluminum is less than 0.05
X: 0.05 or lower than untreated aluminum.

Masking characteristics and granularity were visually observed and evaluated as follows:

◎: better than untreated aluminum
○: difference from untreated aluminum is small
Δ: slightly poor than untreated aluminum
X: poor than untreated aluminum The aluminum pigment compositions of Examples 1 to 12 and Comparative Examples 1 and 2 were evaluated for aging stability in accordance with the following method.

[Evaluation 3 (Aging Stability)]

An aluminum pigment composition (50 g) was taken and transferred to a 200-mL tin can and sealed airtight. After the composition was stored under airtight conditions while increasing temperature at 50° C. for 3 months. An aqueous metallic paint was prepared in accordance with the aforementioned formulation and a paint film was prepared. Masking characteristics before and after increasing temperature were visually observed. Evaluation was performed as follows:

◎: better than before increasing temperature
○: small difference from before increasing temperature
Δ: slightly poorer than before increasing temperature
X: poorer than before increasing temperature The results of Evaluations 1, 2 and 3 are shown in Table 1.

TABLE 1

| | Evaluation 1 | Evaluation 2 | | | | Evaluation 3 |
|---|---|---|---|---|---|---|
| | Storage stability | Brightness | Flip-flop characteristics | Masking characteristics | Granularity | Aging stability |
| Example 1 | ○ | ◎ | ◎ | ○ | ○ | Δ |
| Example 2 | ○ | ○ | Δ | Δ | Δ | Δ |
| Example 3 | ○ | ○ | ○ | ○ | ○ | Δ |
| Example 4 | ○ | ○ | ○ | ○ | ○ | Δ |
| Example 5 | ○ | ○ | ○ | ○ | ○ | Δ |
| Example 6 | ○ | ○ | ◎ | ◎ | ◎ | Δ |
| Example 7 | ○ | ○ | ○ | ○ | ○ | Δ |
| Example 8 | ○ | ○ | ○ | ○ | ○ | ○ |
| Example 9 | ○ | ○ | ○ | ○ | ○ | ○ |
| Example 10 | ○ | ◎ | ◎ | ○ | ○ | ○ |
| Example 11 | ○ | ○ | ○ | ○ | Δ | ○ |
| Example 12 | ○ | ○ | ○ | ○ | ○ | ○ |
| Comparative Example 1 | X | 250 | 1.90 | Standard | Standard | Δ |
| Comparative Example 1 | Δ | X | X | X | X | Δ |

According to the present invention, it is possible to provide a metal pigment composition excellent in aging stability, which can be used in aqueous paint and aqueous ink and contributes to excellent storage stability of paint. The result-

The invention claimed is:

1. A metal pigment composition comprising a metal pigment treated with at least one organic molybdenum compound, wherein the at least one organic molybdenum compound is an amine molybdate salt and the composition contains at least one other organic molybdenum, compounds except an amine molybdate salt, wherein the other organic molybdenum compound is a compound represented by the following formula (2):

[Formula 2]

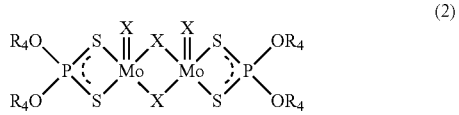
(2)

(wherein R$_4$ may be the same or different and represents an organic group of 1 to 24 carbon atoms; and X is an S atom o an O atom).

2. A metal pigment composition containing a metal pigment treated with at least one organic molybdenum compound, wherein the at least one organic molybdenum compound is an amine molybdate salt and the amine molybdate salt is a compound obtained by the reaction between a molybdic acid and an amine compound the composition contains at least one other organic molybdenum compounds except an amine molybdate salt, wherein the other organic molybdenum compound is a compound represented by the following formula (3):

[Formula 3]

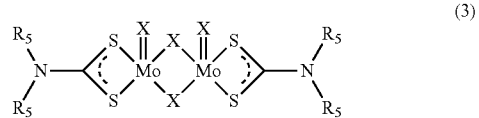
(3)

(where R$_5$ may be the same or different and represents an organic group of 1 to 24 carbon atoms; and X is an S atom or an O atom).

3. The metal pigment composition according to claim 1 or 2, further comprising at least one agent selected from the group consisting of an anti-oxidizing agent, an anti-reducing agent and a photostabilizer.

4. The metal pigment composition according to claim 3, wherein the anti-oxidizing agent is at least one compound selected from the group consisting of phenol compounds, phosphorus compounds and sulfur compounds.

5. The metal pigment composition according to claim 3, wherein the anti-reducing agent is at least one compound selected from the group consisting of nitro compounds and halogen compounds.

6. The metal pigment composition according to claim 3, wherein the photostabilizer is at least one compound selected from the group consisting of benzotriazole compounds, benzophenone compounds, salicylate compounds, cyanoacrylate compounds, oxalic acid derivatives, hindered amine compounds (HALE) and hindered phenol compounds.

7. The metal pigment composition according to claim 3, wherein a total amount of the at least one agent selected from the group consisting of an anti-oxidizing agent, an anti-reducing agent and a photostabilizer is from 0.01 to 10 parts by weight relative to 100 parts by weight of the metal pigment.

8. The metal pigment composition according to claim 1 or 2, wherein the metal pigment is composed of aluminum powder.

9. The metal pigment composition according to claim 1 or 2, wherein an amine of the amine molybdate salt is at least one of amine compounds represented by the following general formula (1):

[Formula 1]

(1)

(where R1, R2 and R3 may be the same or different and each represents a hydrogen atom or a monovalent or divalent hydrocarbon group of 1 to 30 carbon atoms optionally containing an ether bond, an ester bond, a hydroxyl group, a carbonyl group and/or a thiol group; R1 and R2 may be combined with each other to form a 5-membered or 6-membered cycloalkyl group, or may be combined with a nitrogen atom to form a 5-membered or 6-membered ring that can contain an additional nitrogen atom or oxygen atom as a linkage atom, or alternatively, R1, R2 and R3 may be combined with one another to form a multi-membered polycyclic composition that can contain one or more additional nitrogen atoms and/or oxygen atoms as linkage atoms; and n is a number from 1 to 2).

10. The metal pigment composition according to claim 9, wherein the amine compound is a secondary amine having one or two of hydrocarbon groups of 3 to 24 carbon atoms.

11. The metal pigment composition according to claim 1 or 2, wherein an amount of the at least one organic molybdenum compound for treatment of the metal pigment is from 0.01 to 10 parts by weight relative to 100 parts by weight of the metal pigment.

* * * * *

UNITED STATES PATENT AND TRADEMARK OFFICE
CERTIFICATE OF CORRECTION

PATENT NO. : 9,017,475 B2
APPLICATION NO. : 12/166733
DATED : April 28, 2015
INVENTOR(S) : Kazuko Nakajima et al.

Page 1 of 1

It is certified that error appears in the above-identified patent and that said Letters Patent is hereby corrected as shown below:

In The Claims

In claim 1, column 15, line 24, "o an" should read --or an--.

Signed and Sealed this
Tenth Day of November, 2015

Michelle K. Lee
*Director of the United States Patent and Trademark Office*